United States Patent [19]
Wilkes

[11] Patent Number: 5,415,338
[45] Date of Patent: May 16, 1995

[54] SOLDER MARKING DEVICE AND METHOD OF MARKING SOLDER

[76] Inventor: Adam Wilkes, 10 Lamoreaux St., West Nanticoke, Pa. 18634

[21] Appl. No.: 237,294

[22] Filed: May 3, 1994

[51] Int. Cl.⁶ ............................................. B23K 3/06
[52] U.S. Cl. ................... 228/244; 228/246; 228/13; 228/41
[58] Field of Search ........... 228/244, 246, 247, 13, 228/14, 15.1, 41, 103; 101/4, 6

[56] References Cited

U.S. PATENT DOCUMENTS

| | | |
|---|---|---|
| 4,021,876 | 5/1977 | Engelhardt . |
| 4,056,136 | 11/1977 | Miller . |
| 4,212,265 | 7/1980 | Buxton .................... 228/244 |
| 4,750,664 | 6/1988 | Furtek . |
| 4,932,581 | 6/1990 | Ohle et al. ................. 228/41 |
| 5,036,174 | 7/1991 | Iwasaki et al. ............ 219/69.12 |
| 5,289,767 | 3/1994 | Montalto et al. ............ 101/35 |

*Primary Examiner*—Samuel M. Heinrich
*Attorney, Agent, or Firm*—Terry M. Gernstein

[57] ABSTRACT

A device automatically places marks, such as notches, on solder as that solder is being dispensed to a soldering operation. The device is entirely mechanical, and places the proper amount of tension on the solder without stretching it, and guides the solder from a storage reel to a marking system. The solder is marked by elements located on a marking wheel that rotates next to a grooved wheel. The tensioning is effected by a plurality of grooved wheels around which the solder is trained and which can be adjusted to control the amount of tension applied to the solder.

20 Claims, 8 Drawing Sheets

SOLDER MARKING DEVICE AND METHOD OF MARKING SOLDER

TECHNICAL FIELD OF THE INVENTION

The present invention relates to the general art of tools work processes, and to the particular field of soldering.

BACKGROUND OF THE INVENTION

Many processes require hand soldering. Current methods for hand-soldering printed circuit boards, or other soldering applications in the electronics industry, the plumbing industry, jewelry construction/repair, and the like, require precise, accurate and repeatable soldering steps.

This is important for several reasons. First, it is important because if a soldered joint on a printed circuit board is prepared too fast, the solder may not have melted properly and was not liquified enough to allow seepage in and around the metal that is being soldered together. In fact, the top surface of the solder may look like there is enough solder, but actually, there is an air pocket in the solder joint. This error can easily happen if a worker has been soldering for a long period of time, and is fatigued.

It is also important to know exactly how much solder is used to prevent waste and inefficiency in soldering methods. If the amount of solder used can be precisely determined, this data can be used to project other jobs, and to measure performance and provide quality control data for other jobs. Still further, knowing precisely how much solder will be necessary for a particular job makes cost projections easier to make, and more precise.

Currently, a worker is taught hand soldering by example, either from a teacher, mentor or from a training film. This method of measuring solder is generally called "eye-bailing." However, this is imprecise, especially with regard to applications in highly technical areas, such as printed circuit boards, or the like. Furthermore, accurate records of solder use are not kept using "eye-ball" techniques, and thus data for other uses and/or other applications may not be accurate. This may also affect quality and reliability of soldering operations. Still further, it is not easy to change the amount of solder used for jobs. Still further, there is no universal way to apply an "eyeball" method developed for one application to other applications.

Yet another drawback to current methods of measuring solder results because of worker fatigue. As a worker tires, his or her accuracy may vary or decrease, and the constant strain of accurately measuring solder may even exacerbate this fatigue.

Therefore, there is a need for a means and a method for accurately, precisely and repeatably marking solder for any particular job, and which can be easily altered and modified for other jobs.

OBJECTS OF THE INVENTION

It is a main object of the present invention to provide a means and a method for accurately, precisely and repeatably marking solder.

It is another object of the present invention to provide a means and a method for marking solder that is not affected by, and does not affect, worker fatigue.

It is another object of the present invention to provide a means and a method for marking solder does not risk contaminating the solder during the marking process.

It is another object of the present invention to provide a means and a method for marking solder that can be easily learned.

It is another object of the present invention to provide a means and a method for marking solder that does not require any special skills, training or experience to carry out a solder marking process.

It is another object of the present invention to provide a means and a method for marking solder that is amenable for use in a large variety of jobs, applications, and fields.

It is another object of the present invention to provide a means and a method for marking solder that automatically marks the solder without any judgement needed from the worker.

It is another object of the present invention to provide a means and a method for marking solder that can be used to train a worker in "eye-bailing" solder usage.

It is another object of the present invention to provide a means and a method for marking solder that is safe for the worker to use.

It is another object of the present invention to provide a means and a method for marking solder that does not require any electric power to operate.

It is another object of the present invention to provide a means and a method for marking solder that does not require any special environment and can be used anywhere.

It is another object of the present invention to provide a means and a method for marking solder in which the speed of marking is set by the speed of solder use, and marking speed does not inhibit solder use speed.

SUMMARY OF THE INVENTION

These, and other, objects are achieved by a solder marker that automatically marks solder as that solder is fed from a supply reel for use. The marker includes a wheel that makes small nicks in the solder as that solder is removed from the supply reel. These nicks have preset spacings between them, with the preset spacings being determined so the exact amount of solder necessary for a particular job will be used. For example, the spacings can be one-quarter inch whereby one-fourth inch of solder is used for each nick. If, for example, a job requires one-quarter inch of solder, or some multiple of one-quarter inch, the worker will be able to use exactly the amount of solder necessary, and need not rely on his or her judgement. The nicks are placed on the solder as that solder is removed from the storage reel, and will thus only be placed on the solder as needed. If the spacing is to be changed, as when a job is changed, or a worker finds that the amount of solder must be changed, the solder marker is changed and virtually no solder will be wasted. A worker can simply multiply the number of solder joints made by the preset spacing to determine the total amount of solder used for a particular job thereby producing accurate records.

More specifically, the solder marking device of the present invention includes a marking wheel having pins or projections that engage the solder as that solder is pulled past the marking wheel. The preset spacings between marks can be changed by altering the projections or by changing marking wheels. In any event, the spacings will be accurate, precise and repeatable. The marking device further includes means for tensioning the solder against the marking wheel so the marks are readily visible, and the device can be easily set up in any convenient location at any convenient position. Thus, the device is easily and conveniently used.

BRIEF DESCRIPTION OF THE DRAWING FIGURES

DETAILED DESCRIPTION OF THE PREFERRED EMBODIMENT OF THE INVENTION

Figure 1:
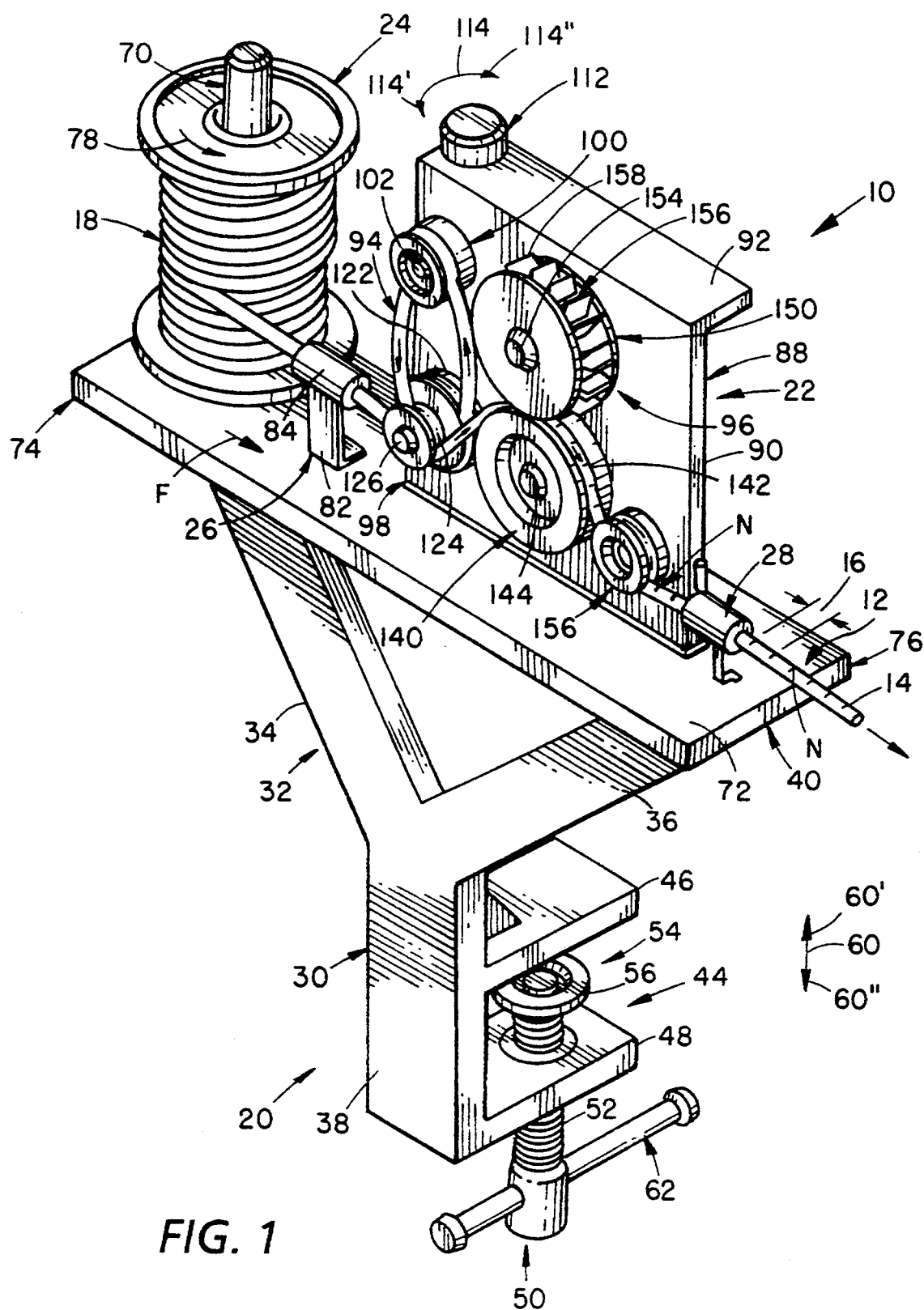
FIG. 1 is a front, top and end perspective view of a solder marking device embodying the present invention.

Shown in FIG. 1 is a solder marking device 10 for automatically marking solder 12 with marks 14 that are spaced apart by precisely and accurately set spacings 16 as that solder is removed from storage reel 18. The precisely set spacing 16 ensures that precise amounts of solder are used and the amount of solder used can be accurately recorded. Device 10 is used in a process of accurately marking solder 14 as will be understood from the following description.

Generally, device 10 includes a support unit 20 which is mounted on a table or other such structure, and supports thereon a solder marking unit 22 as well as a solder storage unit 24 and solder guide elements 26 and 28.

More specifically, the preferred form of support unit 20 includes a Y-shaped frame 30 having an upper portion 32 with two arms 34 and 36 connected at one end thereof to a base 38 and diverging from each other from that base to spaced apart distal ends that support a bench 40 thereon. Frame 30 can be formed of any suitable material, including metal and plastic and positions the solder marking unit in a location that is convenient and comfortable for the user. A clamp unit 44 for attaching device 10 to a support, such as a workbench or the like is located on a lower end of base 38. The preferred form of clamp plate 44 includes a top plate 46 fixed to base 38 and extending outwardly therefrom and a bottom plate 48 fixed to base 38 at a location spaced from top plate 46 and extending outwardly from base 38 to accommodate a support surface between the plates 46 and 48. A screw element 50 is threadably attached to bottom plate 48 and includes a threaded section 52 that threadably engages a cooperating thread located in plate 48 to move distal end 54 having surface-engaging element 56 thereon, in directions 60' and 60" as indicated by the double-headed arrow 60 toward and away from plate 46 to execute a clamping function. A handle 62 is used to operate screw element 50 of clamp 44 as will be understood by those skilled in the art from the teaching of this disclosure. Support unit 20 can locate and position device 10 in any convenient location and position for use by a worker, and thus permits easy use of device 10.

Solder storage unit 24 includes a spool pin 70 fixed at one end thereof to upper surface 72 of bench 40 and extending upwardly therefrom near a feed end 74 of device 10, with opposite end 76 of bench 40 being a discharge end. The spool pin can be telescoping if desired so various sized solder storage reels can be accommodated. For the sake of convenience, flow directions are taken with reference to movement of solder 14 through device 10, with a feed direction being indicated by arrow F. Storage reel 18 contains solder to be used in an application, and is rotatably supported on pin 70 to move in direction 78 and to discharge solder 14 therefrom as solder 14 is pulled. Additional pins 70 can be included to store solder reels, if desired.

Solder 14 fed off of reel 18 moves in direction F through first, upstream, guide element 26 which includes a support 82 mounted on surface 72 and projecting upwardly therefrom and a tubular guide 84 through which solder 14 moves. Base 82 is sized to maintain a proper tension on solder 14 and to keep the solder in proper position as will be understood from the following discussion. Second, downstream, guide element 28 is similar to element 26, and thus will not be further described.

Figure 2:
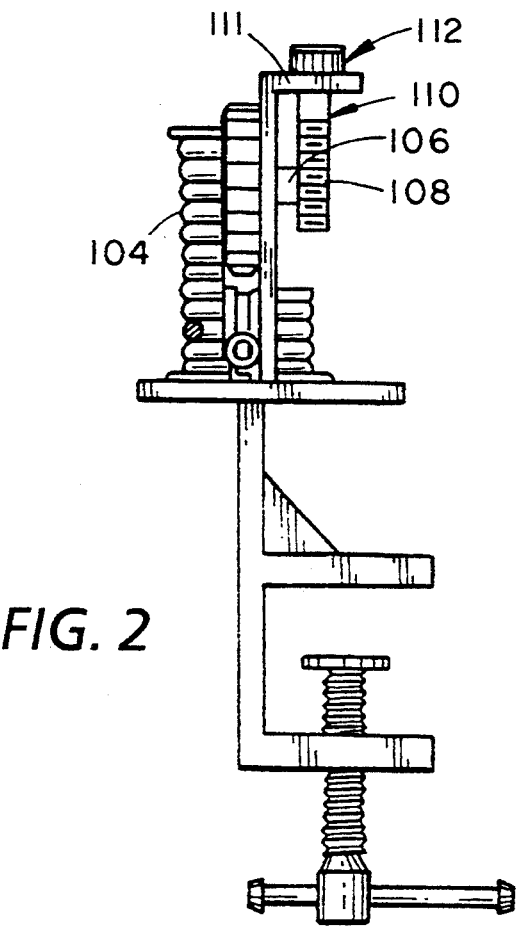
FIG. 2 is a front elevational view of the solder marking device.

Solder marking unit 22 includes an L-shaped base 88 having a long leg 90 attached at one end thereof to bench 40 and extending upwardly therefrom and a short leg 92 that is spaced above surface 72. Solder marking unit 22 includes a solder tension controlling means 94 located upstream of solder marking means 96. Solder tension controlling means 94 includes a stationary guide wheel 98 mounted on long leg 90 and a movable tension wheel 100 mounted on long leg 90. Wheel 100 is stationary once mounted, but can be moved to adjust the tension on solder 14; therefore, wheel 00 will be referred to as movable. As shown in FIGS. 1 and 2, movable wheel 100 is mounted on long leg 90 by a bolt 102 having a block 104 on a distal end thereof. Block 104 has a screw thread 106 on one end thereof, and screw thread 106 mates with a screw thread 108 on bolt 110 which is mounted on short leg 92 and has a knob 112 on a top end thereof. Knob 112 is used to rotate screw thread 108 in directions 114' and 114" as indicated by arrow 114. As can be understood by comparing FIGS. 1, 2 and 4, 5, bolt 102 is mounted on long leg 90 to extend through elongated hole 116. Block 102 includes a bore having an internal thread that cooperates with an external thread on bolt 102 to lock block 102 to long leg 90 when wheel 100 is in the desired position on long leg 90. Movement of wheel 100 occurs when knob 112 is rotated in either direction 114' or direction 114" via the cooperation between screw threads 106 and 108 since bolt 110 is fixed with respect to short leg 92. Cooperating washers and nuts such as elements 111 and 111' can be placed on bolt 110 adjacent to short leg 92 to ensure that bolt 110 does not move up or down with respect to short leg 92 as the bolt is being rotated.

Figure 3:
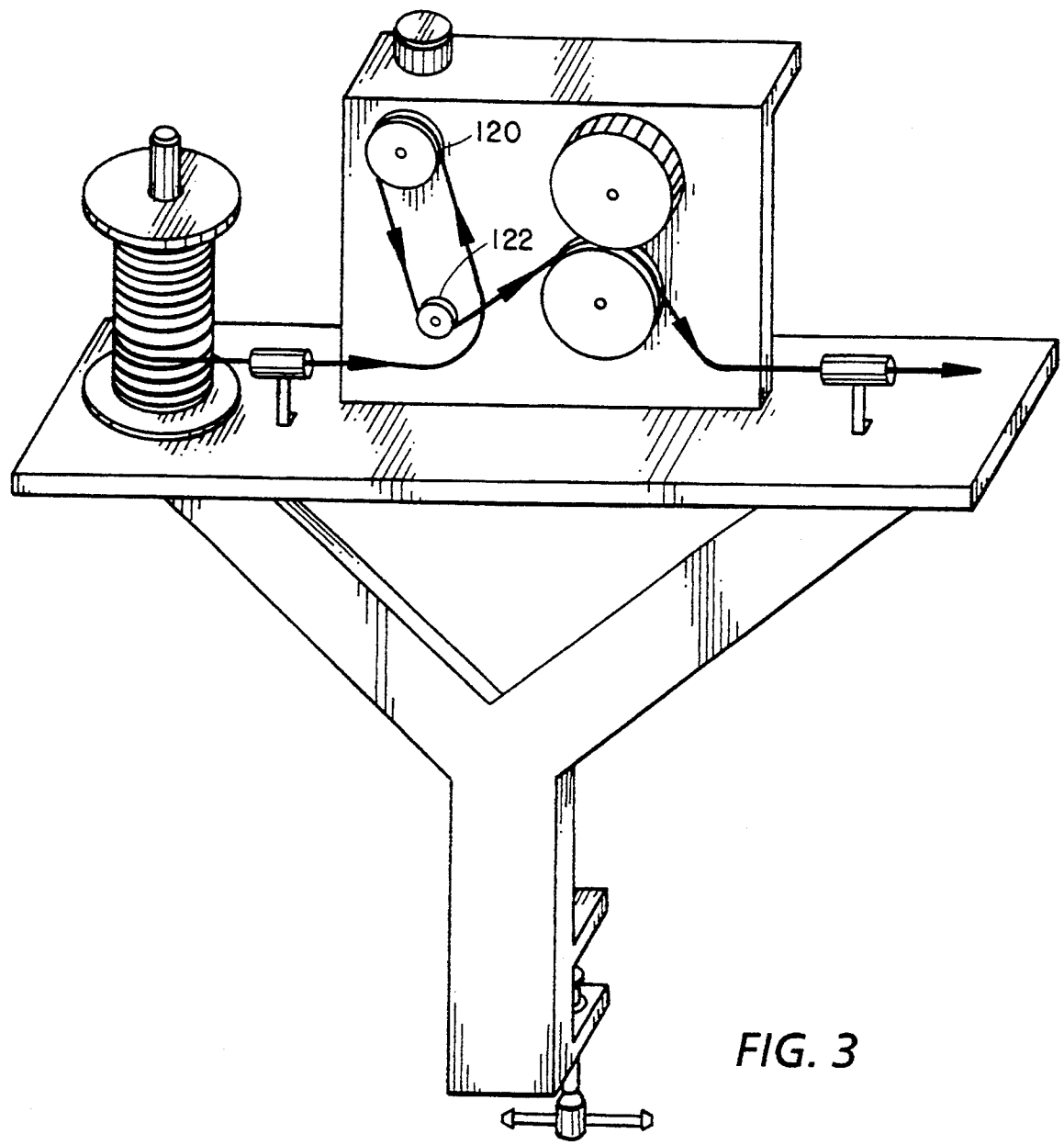
FIG. 3 is a front perspective view of the solder marking device with solder being pulled therethrough and marked at precise and accurate location thereon.

As shown in FIGS. 1 and 3, tension wheel 100 includes a groove 120 which accommodates solder 14 as that solder moves past tension wheel 100. Guide wheel 98 includes an first groove 122 and a second groove 124, both of which accommodate solder 14 as that solder moves through marking device 10. A bolt 126 fixes wheel 100 to long leg 90 and extends through hole 130 in long leg 90. Wheel 100 is fixed to long leg 90, but is free to rotate about bolt 126 as will be understood from this disclosure.

Movement of wheel 100 on leg 90 moves that wheel toward or away from wheel 98. Such movement places appropriate amounts of tension on solder 14 as that solder moves past these two wheels. Solder size variations can also be accommodated using this adjustment.

Figure 4:
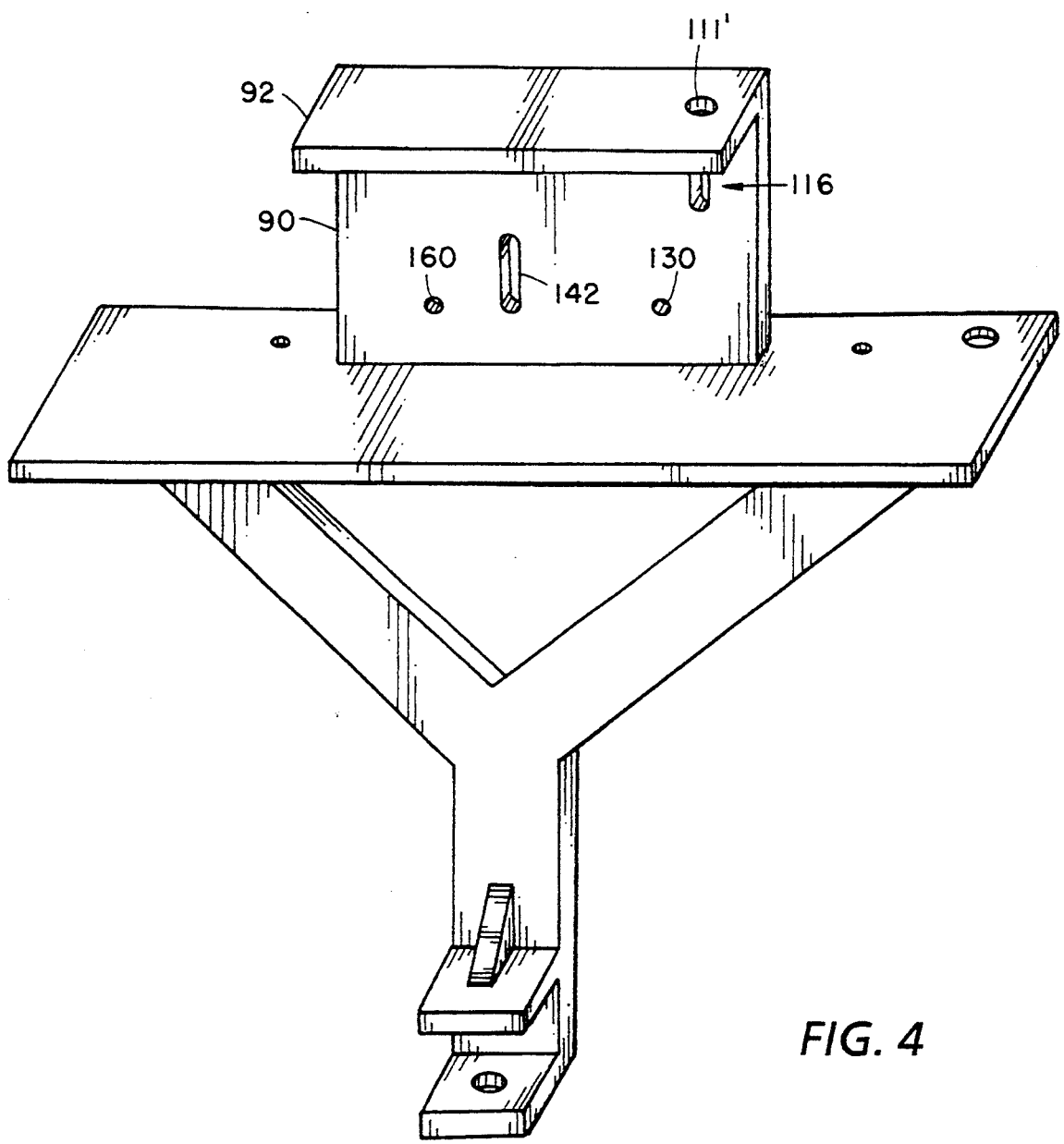
FIG. 4 is a rear perspective view of the frame of the marking device.
Figure 5:
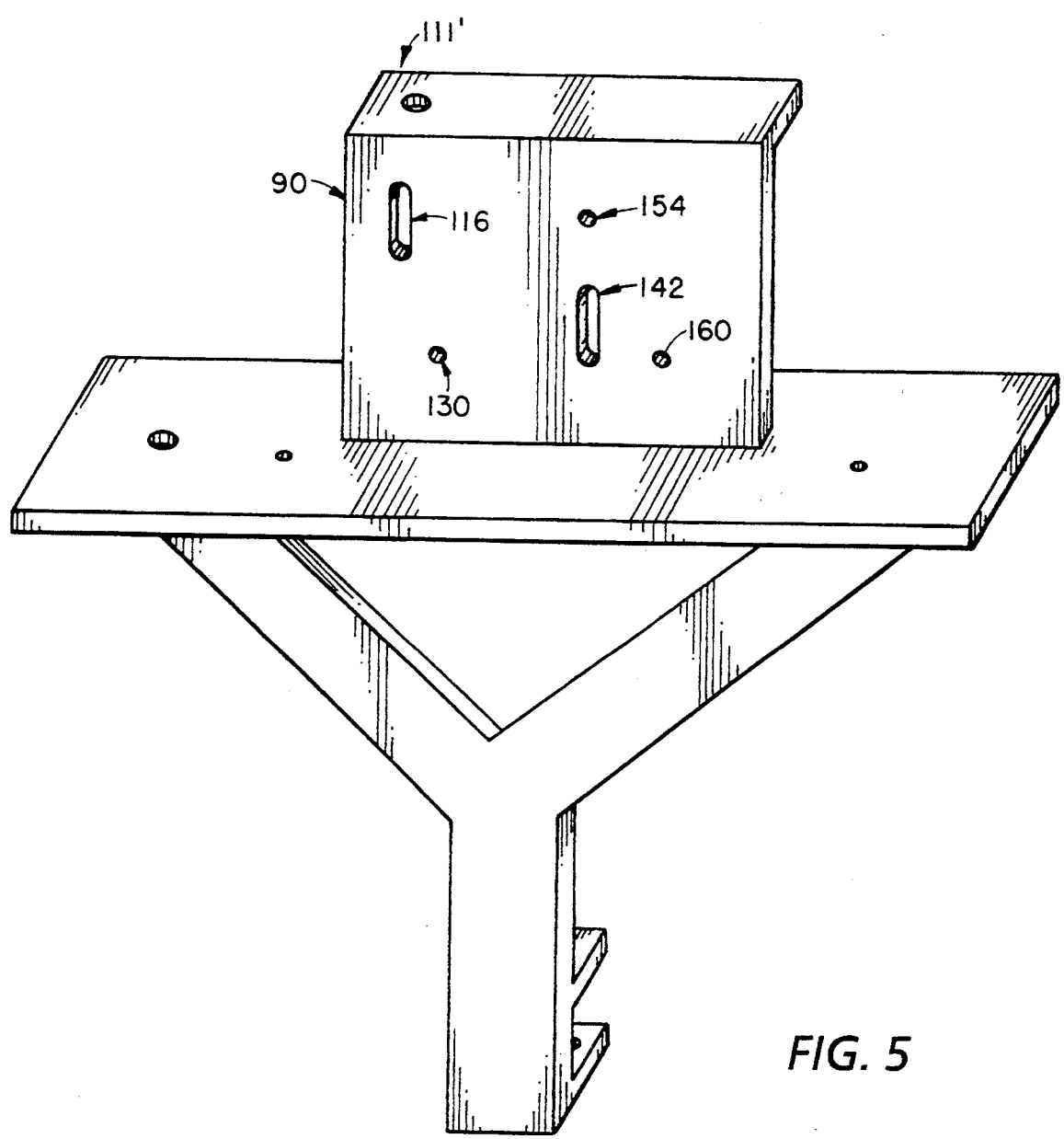
FIG. 5 is a front perspective view of the frame.
Figure 6:
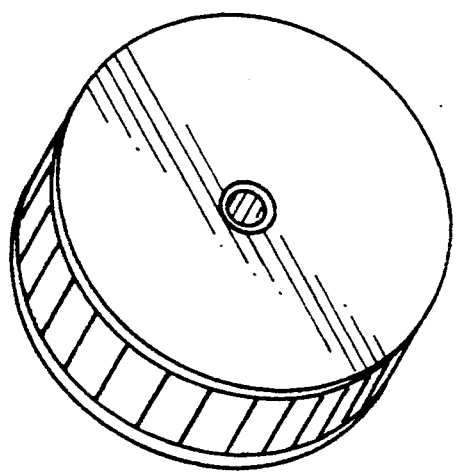
FIG. 6 shows a marking wheel that is used in the marking device of the present invention.
Figure 7:
FIG. 7 is an elevational view of the marking wheel shown in FIG. 6.

Solder marking means 96 includes a base wheel 140 having a groove 142 therein for receiving solder 14 as that solder moves out of groove 124 of wheel 98. Wheel 140 is fixed to long leg 90 by bolt 144 that extends through a hole 142 defined through long leg 90. As shown in FIGS. 4 and 5, hole 142 is elongate whereby wheel 140 can be moved up and down on leg 90. Solder marking means 96 further includes a kinking wheel 150 mounted on leg 90 above wheel 140 by a bolt 154 extending through a bolt-receiving hole 154 defined through leg 90. Kinking wheel 150 includes means 156 for forming notches N in solder 14 as that solder passes by wheel 150. Means 156 preferably include teeth 158, the front edges of which engage the solder as that solder passes between the nip formed between wheels 150 and 140. The teeth are located and positioned to form the notches as the solder passes through the nip. The teeth are spaced apart from each other a specified distance to set distance 16 with precision and accuracy. The notching of solder 14 occurs automatically as that solder passes through means 96. Since the solder is notched by mechanical means, the notch spacing will be precise and accurate. Since wheel 140 is mounted in an elongate hole 142, it can be moved up or down towards hole 154 to accommodate various sized kinking wheels as well as variations in solder size. Pre-molded kinking wheels can be changed to change the size of the spacing 16 in one form of the invention. As will be discussed, other forms of the kinking wheel are also envisioned for this invention. A storage means can be included on device 10 for the wheels, as well as for other soldering equipment and accessories.

Solder 14 exiting means 96 moves past downstream tensioning wheel 156 that is mounted on leg 90 by a bolt 158 extending through hole 160 on leg 90. Wheel 156 includes a groove which accommodates solder 14 as that solder exits means 96 and moves toward guide 28. Wheel 156 produces the proper amount of tension on solder 14 and prevents solder 14 from slipping as it moves through means 96.

As can be seen in FIGS. 1 and 3, the method of marking solder associated with device 10 includes feeding solder from a storage reel that is located in a convenient position near a work area, through a guide to a tensioning means, and from the tensioning means to a marking means which includes spaced marking edges that engage the solder as it moves through the marking means. The solder is held in a preset tension in the marking means, and then fed via downstream guide to a use location with notches defined therein at preselected intervals according to the spacing between the marking edges. The looping of the solder reduces, if not totally eliminates, errors associated with stretching the solder as it is being pulled off the supply reel.

Figure 8:
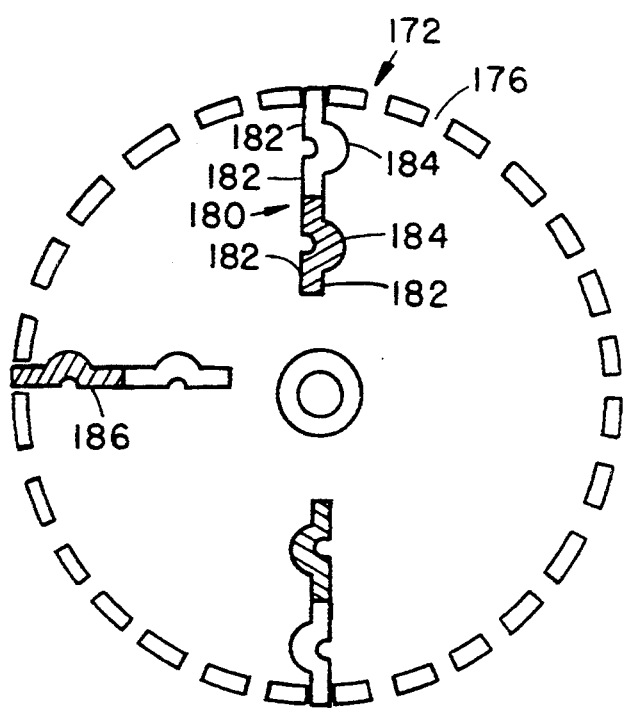
FIG. 8 shows an adjustable marking wheel.
Figure 9:
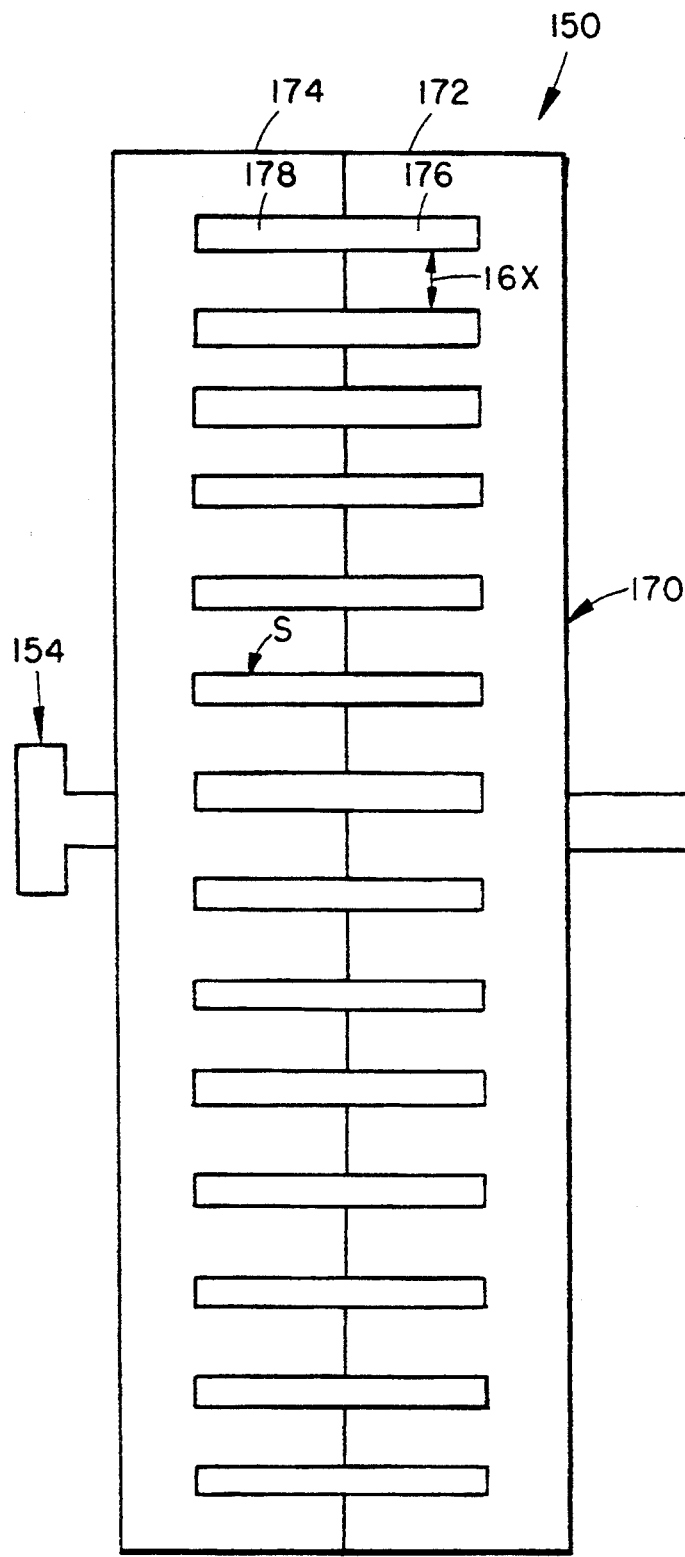
FIG. 9 is an elevational view of the assembled marking wheel.

A preferred form of the marking wheel is shown in FIGS. 6–11, and includes a case 170 having two portions 172 and 174 that are secured together by screw thread means or friction fit or the like. Case portions 172 and 174 each have slots, such as slots 176 and 178 defined therein to align with each other when the case portions are connected together as shown in FIG. 9 to define slots S that are spaced apart by a distance 16X. As will be understood, distance 16X is a multiple of distance 16 so notches N can be formed on desired center-to-center spacing.

Figure 11:
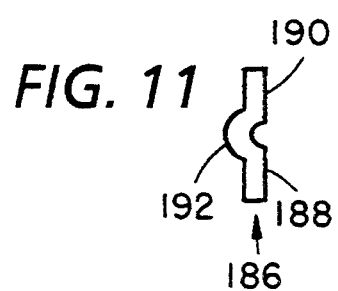
FIG. 11 shows a side elevational view of the marker shown in FIG. 10.
Figure 10:
FIG. 10 shows a marker used in the marking wheel.

Referring to FIGS. 8, 10 and 11, it can be seen that the portions, such as portion 172, include guide tracks 180 adjacent to each slot 176 (only three guide tracks have been shown for the sake of clarity of disclosure; however, there is a guide track adjacent to each slot). Each guide track includes linear portions 182 and curved portions 184. A marking element 186 is positioned in each guide track and includes linear portions 188 and 190 separated by a curved portion 192. Linear portions 188 and 190 correspond to track linear portions 182, and curved portion 192 corresponds to curved portions 184 whereby once the marking element is located in a guide track, it will remain in place and will not move radially of the wheel. The marking elements are moved in the guide tracks by separating portions 172 and 174, and lifting the marking elements out of the tracks, and replacing them in the desired position within the track. In this manner, distance 16 can be set by moving selected marking elements in their guide tracks to extend out of the slots S while other marking elements are inside the wheel so no marking edge is located outside the slot S associated therewith. As shown in FIG. 8, only one mark will be made when wheel 150 rotates 180°. Outer edges 194 of the marking elements can be formed to mark the solder rather than notch it, as by placing an ink mark on the solder. In such a case, the ink can be stored in the elements and should be of the type that will not contaminate the solder joint. Alternatively, an ink pad can be placed adjacent to the wheel so the edges contact the ink pad before they contact the solder.

Figure 13A:
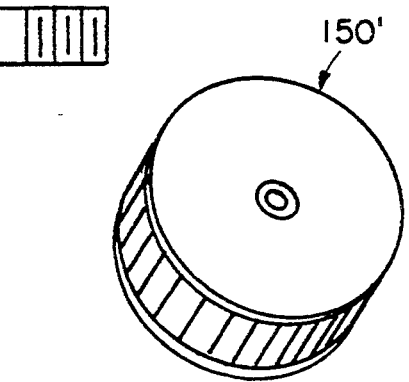
FIGS. 13A and 13B show another form of marking wheel having teeth that prevent retrograde movement of the solder and emit an audible signal every time the solder is marked.
Figure 13B:

An alternative form of the marking wheel is shown in Figures 13A and 13B. Wheel 150' is one piece and includes a plurality of teeth 200 defined in the rim thereof on spacings that correspond to spacing 16. Different wheels 150' will be used when spacing 16 is changed. Teeth 200 engage the solder as it moves past marking means 96. When these teeth engage solder 14 an audible signal is emitted every time a mark is placed on the solder, and movement of solder in the opposite direction is prevented.

Figure 12:
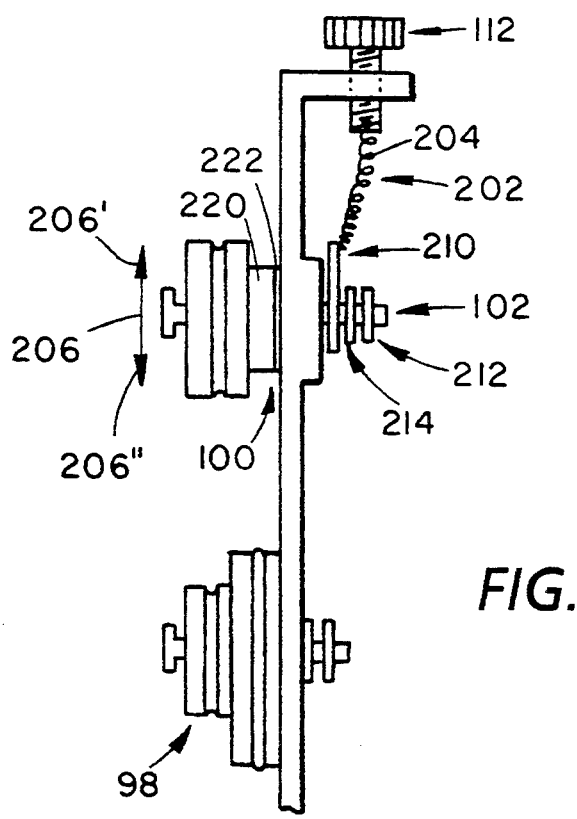
FIG. 12 is a front elevational view of a marking device using a spring unit to connect an adjustment wheel to a tensioning wheel.

An alternative form of adjusting means is shown in Figure 12. Adjusting means 202 is used to move wheel 100 and replaces the cooperating threads discussed above in regard to FIG. 2. Means 202 includes a spring 204 connecting knob 112 to bolt 102 to move that bolt in directions 206' and 206" as shown by double-headed arrow 206. Spring 204 is connected at one end thereof to the bolt connected to knob 112 and at the other end thereof to a spring connector element 210 mounted on bolt 102. Spring 204 can be adjusted to permit knob 112 to turn easier in one direction than in the other to remind the operator which direction the knob is being turned Lock washer 214 and nut 212 ensure that element 210 remains in place on bolt 102. It is noted that the nip between wheels 98 and 100 is shown very large in FIG. 12 for the sake of clearly showing the spring means. A counter mechanism 220 is shown in FIG. 12. This counter mechanism records the number of revolutions and/or fractional revolutions made by the wheel 150 so a record of the number of notches can be kept. A preferred form of the counter can be an odometer-type counter. Furthermore, a one-way lock 222 can be located to ensure only one direction of operation. It is also noted that elastomeric material can be placed in the grooves, especially those associated with the marking wheel, to protect the solder.

Figure 14:
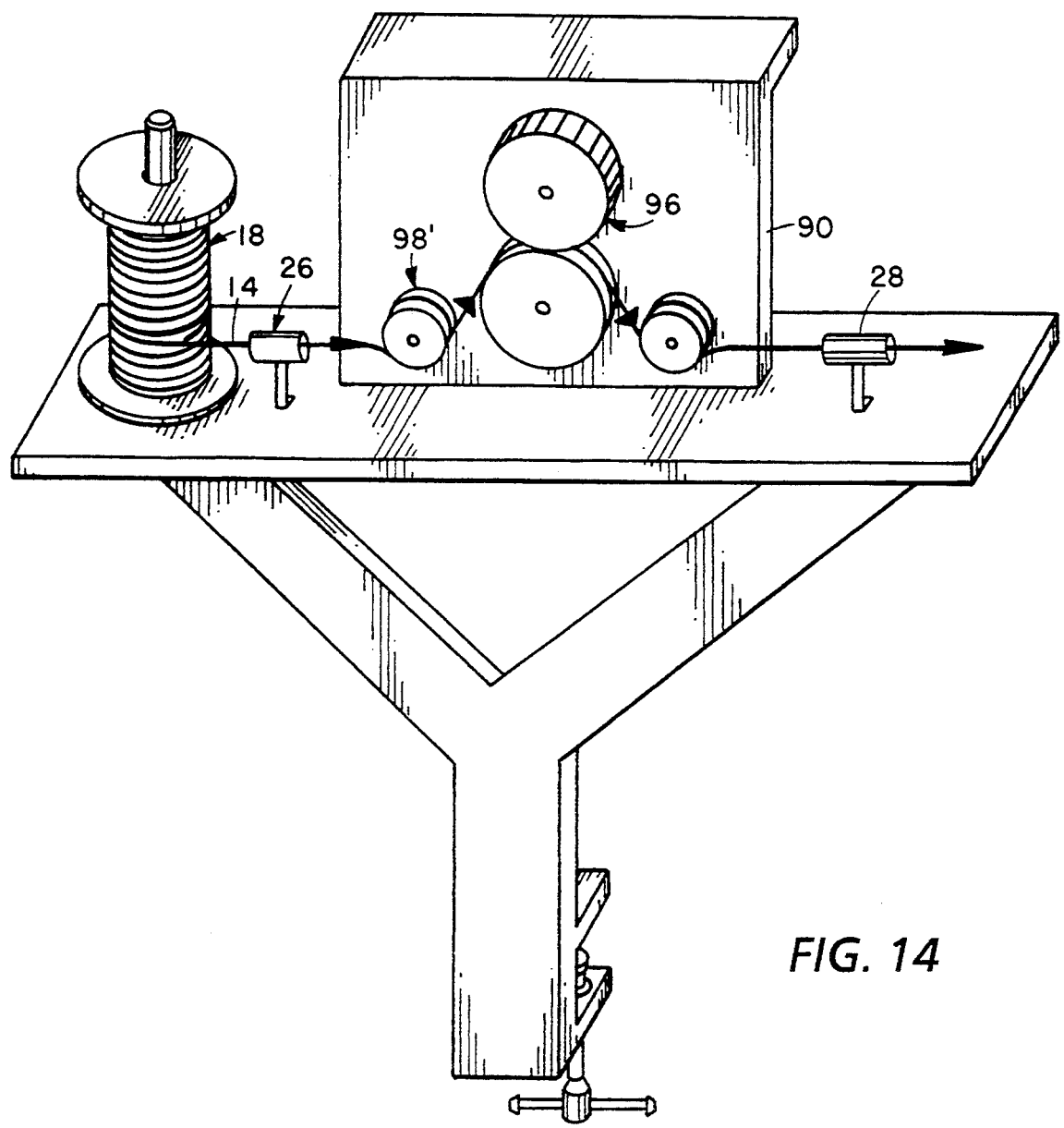
FIG. 14 is a perspective view of another form of the marking device.

An alternative form of device 10 is shown in FIG. 14 as device 10'. Device 10' is identical to device 10 except that device 10' does not include wheel 100 of a tensioning means 94' which only includes a wheel 98' so solder feeds directly from reel 18 to guide element 26 and to marking means 96 via wheel 98' and to wheel 156 from means 96. Solder then moves to guide 28 for discharge.

It is understood that while certain forms of the present invention have been illustrated and described herein, it is not to be limited to the specific forms or arrangements of parts described and shown.

I claim:

1. A solder marking device comprising:
   A) a support unit having a bench and means for attaching said bench to a support structure;
   B) a solder storage unit on said bench;
   C) solder tension controlling means on said bench for applying tension to solder after the solder is fed from said storage unit; and
   D) solder marking means on said bench for marking the solder and including
      (1) support means for receiving solder from said tension controlling means and supporting such solder, and
      (2) a solder marking element mounted on said bench adjacent to said support means and having contact elements mounted thereon at locations which are spaced apart from each other by preselected spacings and positioned to contact the solder as that solder moves through said solder marking means and place a series of marks on the solder which are spaced apart from each other a pre-set distance.

2. The solder marking device defined in claim 1 wherein said tension controlling means includes guides mounted on said bench.

3. The solder marking device defined in claim 2 wherein said tension controlling means further includes a grooved tension wheel and a grooved guide wheel.

4. The solder marking device defined in claim 3 wherein said tension controlling means guide wheel further includes two grooved elements with the solder moving from one grooved element to said grooved tension wheel and then back to the other grooved element before leaving said tension controlling means.

5. The solder marking device defined in claim 4 wherein said solder marking means support means includes a grooved wheel.

6. The solder marking device defined in claim 5 solder marking means marking element includes a notching means for placing notches on said solder.

7. The solder marking device defined in claim 6 wherein said notching means includes a case having two portions connected together by releasing means, a plurality of tracks in one of said portions, and a notching defining element located in at least one of said tracks.

8. The solder marking device defined in claim 7 wherein each of said plurality of tracks includes two curved sections, and a plurality of linear sections, and said notch defining element includes a curved portion and a linear portion.

9. The solder marking device defined in claim 8 wherein each of said portions includes a slot that aligns with a corresponding slot on the other portion to define an opening, with said opening being aligned with at least one track.

10. The solder marking device defined in claim 6 wherein said notching means includes a plurality of teeth.

11. The solder marking device defined in claim 5 wherein said solder tension controlling means includes an adjusting system having an adjustment knob on said bench and means for connecting said knob to said grooved tension wheel and moving said grooved tension wheel with respect to said guide wheel.

12. A process for marking solder comprising:
   A) removing solder from a storage reel;
   B) tensioning the solder as it is being removed from the storage reel;
   C) placing marks on the solder at pre-selected intervals; and
   D) dispensing the marked solder.

13. The process defined in claim 12 wherein said step of tensioning the solder includes training the solder around a first grooved wheel to a second grooved wheel, training the solder around the second grooved wheel and then training the solder around a third grooved wheel.

14. The process defined in claim 13 further including a step of guiding the solder as it is being removed from the storage reel.

15. The solder marking device defined in claim 14 further including a step of guiding the solder as it is being dispensed.

16. The solder marking device defined in claim 14 further including a step of guiding the solder around another grooved wheel during said step of p].acing marks on the solder.

17. The solder marking device defined in claim 16 further including a step of adjusting the tension placed on the solder.

18. The solder marking device defined in claim 17 further including a step of emitting a signal every time a mark is placed on the solder.

19. The solder marking device defined in claim 1 wherein said solder marking means further includes means for emitting a signal every time a mark is placed on said solder.

20. The solder marking device defined in claim 19 wherein said means for emitting a signal included means for preventing reverse movement of said solder.

* * * * *